United States Patent
Stander et al.

(10) Patent No.: US 8,448,963 B2
(45) Date of Patent: May 28, 2013

(54) DISPLACEMENT MEASUREMENT SYSTEM AND METHOD FOR A SUSPENSION SYSTEM IN A VEHICLE

(75) Inventors: Francois Stander, Dubuque, IA (US); Denis J. Montocchio, Dubuque, IA (US); Dean L. Mish, Potosi, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/027,799

(22) Filed: Feb. 15, 2011

(65) Prior Publication Data

US 2012/0205887 A1    Aug. 16, 2012

(51) Int. Cl.
*B60G 9/02* (2006.01)
*B60G 13/02* (2006.01)
*B62D 21/11* (2006.01)
*F16F 5/00* (2006.01)

(52) U.S. Cl.
USPC ............. 280/124.11; 280/124.157; 267/64.26

(58) Field of Classification Search
USPC ............ 280/124.1, 5.514, 6.15, 6.157, 6.159, 280/124.154, 124.127, 124.145, 124.148, 280/124.109, 124.123, 124.157, 124.11; 267/64.16, 64.26
See application file for complete search history.

(56) References Cited

U.S. PATENT DOCUMENTS

| | | | |
|---|---|---|---|
| 3,624,456 A | 11/1971 | Elliott et al. | |
| 4,017,099 A | 4/1977 | Hegel et al. | |
| 4,293,139 A | 10/1981 | Brown | |
| 4,310,172 A | 1/1982 | Claude et al. | |
| 4,659,104 A * | 4/1987 | Tanaka et al. | 280/6.158 |
| 4,802,657 A | 2/1989 | Wijnhoven et al. | |
| 4,909,536 A | 3/1990 | Hale | |
| 4,989,844 A | 2/1991 | Wijnhoven et al. | |
| 5,135,203 A | 8/1992 | Wijnhoven et al. | |
| 5,152,547 A | 10/1992 | Davis | |
| 5,220,505 A * | 6/1993 | Yokote et al. | 701/37 |
| 5,269,186 A | 12/1993 | Yopp | |
| 5,465,290 A | 11/1995 | Hampton et al. | |
| 5,603,387 A * | 2/1997 | Beard et al. | 180/89.12 |
| 6,029,764 A * | 2/2000 | Schubert | 180/89.13 |
| 6,073,714 A * | 6/2000 | McHorse et al. | 180/89.14 |
| 6,416,061 B1 | 7/2002 | French et al. | |
| 7,077,226 B2 * | 7/2006 | Oliver et al. | 180/89.12 |
| 7,077,227 B2 * | 7/2006 | Oliver et al. | 180/89.12 |
| 7,234,386 B2 * | 6/2007 | Schedgick et al. | 92/113 |
| 7,261,304 B2 | 8/2007 | Trudeau et al. | |
| 2008/0021611 A1 * | 1/2008 | Hiebert et al. | 701/37 |

* cited by examiner

*Primary Examiner* — Joseph Rocca
*Assistant Examiner* — Keith Frisby
(74) *Attorney, Agent, or Firm* — Taylor IP, P.C.

(57) ABSTRACT

A vehicle includes a chassis, an axle, a suspension strut and a sensor assembly. The suspension strut includes a barrel having a lower end and an upper end, and a rod having a lower end and an upper end. The rod lower end is slidably received within the barrel upper end. The barrel lower end is coupled with the axle and the rod upper end is coupled with the chassis. A sensor assembly is coupled between the chassis and the barrel for sensing relative movement between the chassis and the barrel.

4 Claims, 5 Drawing Sheets

DISPLACEMENT MEASUREMENT SYSTEM AND METHOD FOR A SUSPENSION SYSTEM IN A VEHICLE

FIELD OF THE INVENTION

The present invention relates to vehicle ride systems for vehicles, and, more particularly, to strut displacement measuring systems.

BACKGROUND OF THE INVENTION

Work vehicles such as construction, forestry, mining and agricultural work vehicles may employ the use of an electronically controlled ride control system to minimize bouncing and vibration of the vehicle as it traverses over uneven or rough terrain. Ride control can improve the bouncing and vibration of the operator, and also may have safety implications as the operator manually operates hydraulically and electrically controlled functions of the vehicle. One way of implementing ride control is to measure the relative displacement between the vehicle chassis and axles as the vehicle moves over the uneven or rough terrain. This can be measured directly, or inferred by measuring the displacement of the suspension strut associated with each attachment location between the vehicle chassis and axle.

A commonly used method for measuring the displacement of a suspension strut is to place a sensor between the axle or axle assembly and the vehicle frame. This is usually achieved by placing a rotary sensor with a lever arm that extends from it, near or on the vehicle's frame, and then having a linkage system connect the lever arm to the axle assembly. Because the axle is often the lowest structural part of the vehicle, it has a tendency to drag through mud in very muddy applications. This means that the linkage system is prone to damage from the mud or debris that flows over the axle.

This method of sensing is needed because the suspension struts of vehicles that have strut displacement sensors, have the strut barrel attached to the vehicle chassis, and the rod section attached to the axle assembly. Since the barrel is a fixed length, while the exposed rod section changes with strut displacement, the strut displacement needs to be measured between the barrel end (or vehicle chassis) and the rod end (or the axle assembly), which forces parts of the sensor into the debris flow zone.

The manufacturer Bell Equipment senses vehicle strut displacement by measuring between the vehicle chassis and the axle assembly. The Bell Equipment design attempts to protect the sensor linkage system by using heavy brackets that elevate the linkage connection higher off the axle so that it is out of the debris flow. This design still leaves the brackets prone to damage, and since the linkage is still relatively low, they are still in danger of being damaged.

The manufacturer Volvo places the strut sensor linkage lower down toward the axle, where it is more vulnerable to debris flow. The Volvo design uses a much sturdier (and therefore more expensive) linkage arrangement in an effort to protect it from damage.

Other methods to protect the displacement sensor might be to place the sensor inside the strut, or use magnetic sensors to measure the position of the piston within the strut. These technologies are commonly used to measure the displacement of hydraulic cylinders, but are expensive and would complicate the strut design considerably.

What is needed in the art is a suspension strut measurement system and method which effectively allows the displacement of the strut to be measured, while minimizing damage to the measurement system during operation of the work vehicle.

SUMMARY

The present invention re-arranges the suspension so that the displacement sensing can be done higher up on the frame, out of the debris flow area. The suspension strut is inverted, by attaching the rod end to the vehicle frame, while attaching the barrel end to the axle assembly, thereby allowing the displacement measurement to occur higher up, and out of the debris flow area.

Since the fixed length barrel forces the relative movement of the strut to occur at the top end of the strut, the displacement sensor is placed in a protected area within the vehicle chassis, while the linkage system is shortened and attached to the top of the barrel assembly where it is protected from debris.

The invention in one form is directed to a vehicle including a chassis, an axle, a suspension strut, and a sensor assembly. The suspension strut includes a barrel having a lower end and an upper end, and a rod having a lower end and an upper end. The rod lower end is slidably received within the barrel upper end. The barrel lower end is coupled with the axle and the rod upper end is coupled with the chassis. A sensor assembly is coupled between the chassis and the barrel for sensing relative movement between the chassis and the barrel.

The invention in another form is directed to a strut displacement measurement system for a vehicle, including a suspension strut and a sensor assembly. The suspension strut includes a barrel having a lower end and an upper end, and a rod having a lower end and an upper end. The rod lower end is slidably received within the barrel upper end. The barrel lower end is couplable with an axle of the vehicle and the rod upper end is couplable with a chassis of the vehicle. The sensor assembly is coupled with the barrel and couplable with the chassis of the vehicle for sensing relative movement between the chassis and the barrel.

The invention in yet another form is directed to a method of measuring a relative displacement between a vehicle chassis and an axle of a vehicle, including the steps of: providing a suspension strut including a barrel having a lower end and an upper end, and a rod having a lower end and an upper end, the rod lower end slidably received within the barrel upper end; coupling the barrel lower end with the axle and the rod upper end with the vehicle chassis; coupling a sensor assembly between said chassis and said barrel; and sensing relative movement between the chassis and the barrel using the sensor assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION

Figure 1:
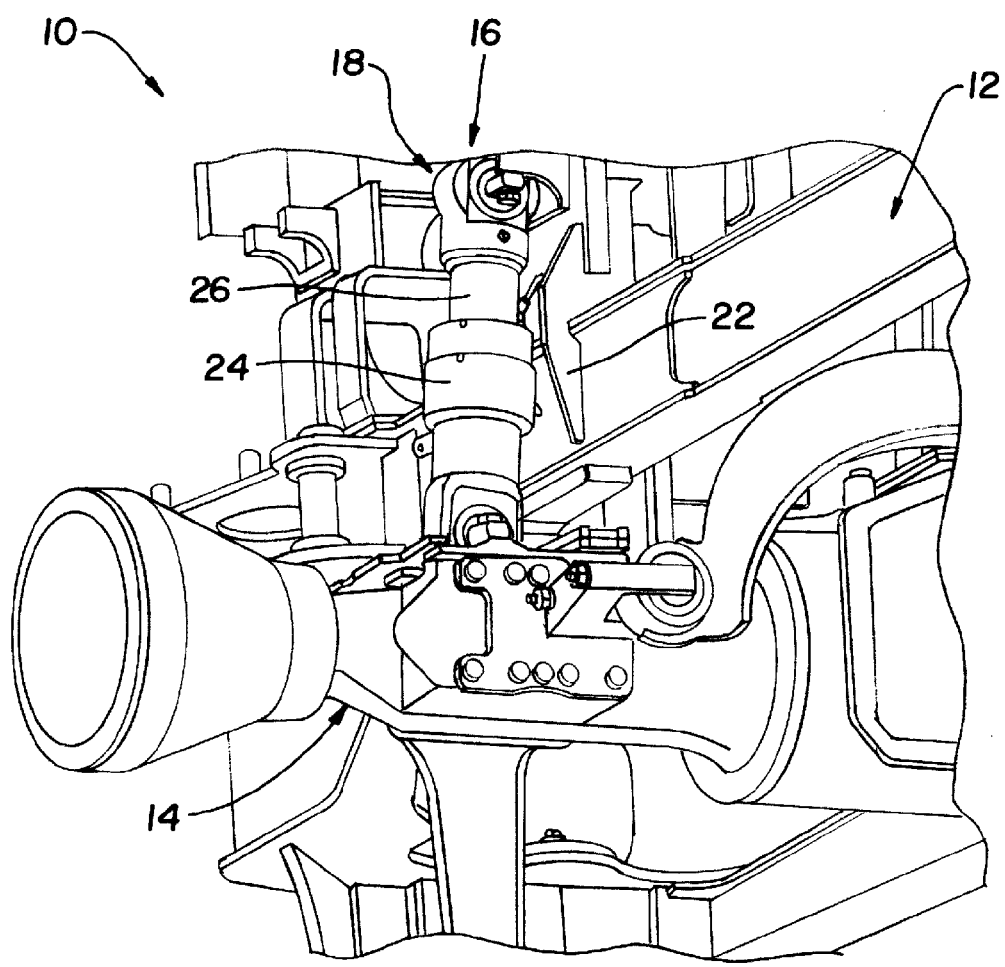
FIG. 1 is a perspective view of a portion of a vehicle, showing a suspension strut interconnected between the vehicle chassis and axle.

Referring now to the drawings, there is shown an embodiment of a portion of a vehicle 10, which generally includes a chassis 12, axle 14, and strut displacement system 16. Vehicle 10 is assumed to be an articulated dump truck in the illustrated embodiment, but could also be a different type of a work vehicle, such as an agricultural or forestry work vehicle. Chassis 12 generally provides the structural framework for vehicle 10, and includes a plurality of interconnected frame members (not individually numbered), which are partially or entirely covered by a vehicle body (not shown). The vehicle body may include an operator cab, panels, fenders, etc. Axle 14 may be a powered or unpowered axle, and may be a front or rear axle, depending upon the particular application. In the illustrated embodiment, axle 14 is assumed to be a powered front axle forming part of a work vehicle with multi-wheel drive capabilities.

Strut displacement measurement system 16 generally includes a suspension strut 18, a sensor assembly 20, and one or more protective structures 22. Suspension strut 18 includes a barrel 24 and a rod 26 reciprocally positioned therein. In the illustrated embodiment, suspension strut 18 is assumed to be a hydraulically operated strut, but could be a different type of fluid operated strut, depending on the application. Barrel 24 includes a lower end 28 and an upper end 30. Similarly, rod 26 includes a lower end 32 and an upper end 34. The lower end 32 of rod 26 is slidably received within the upper end 30 of barrel 24. The lower end 28 of barrel 24 is coupled with axle 14, and the upper end 34 of rod 26 is coupled with chassis 12.

Sensor assembly 20 is coupled between chassis 12 and barrel 24, and senses relative movement between chassis 12 and barrel 24. More particularly, sensor assembly 20 is coupled with upper end 30 of barrel 24. Lower end 28 of barrel 24 is pivotally connected with axle 14, but is longitudinally fixed relative to the upper surface of axle 14. Thus, sensing relative movement between chassis 12 and barrel 24 using sensor assembly 20 can, in turn, be used to indirectly sense movement between chassis 12 and axle 14.

Figure 2:
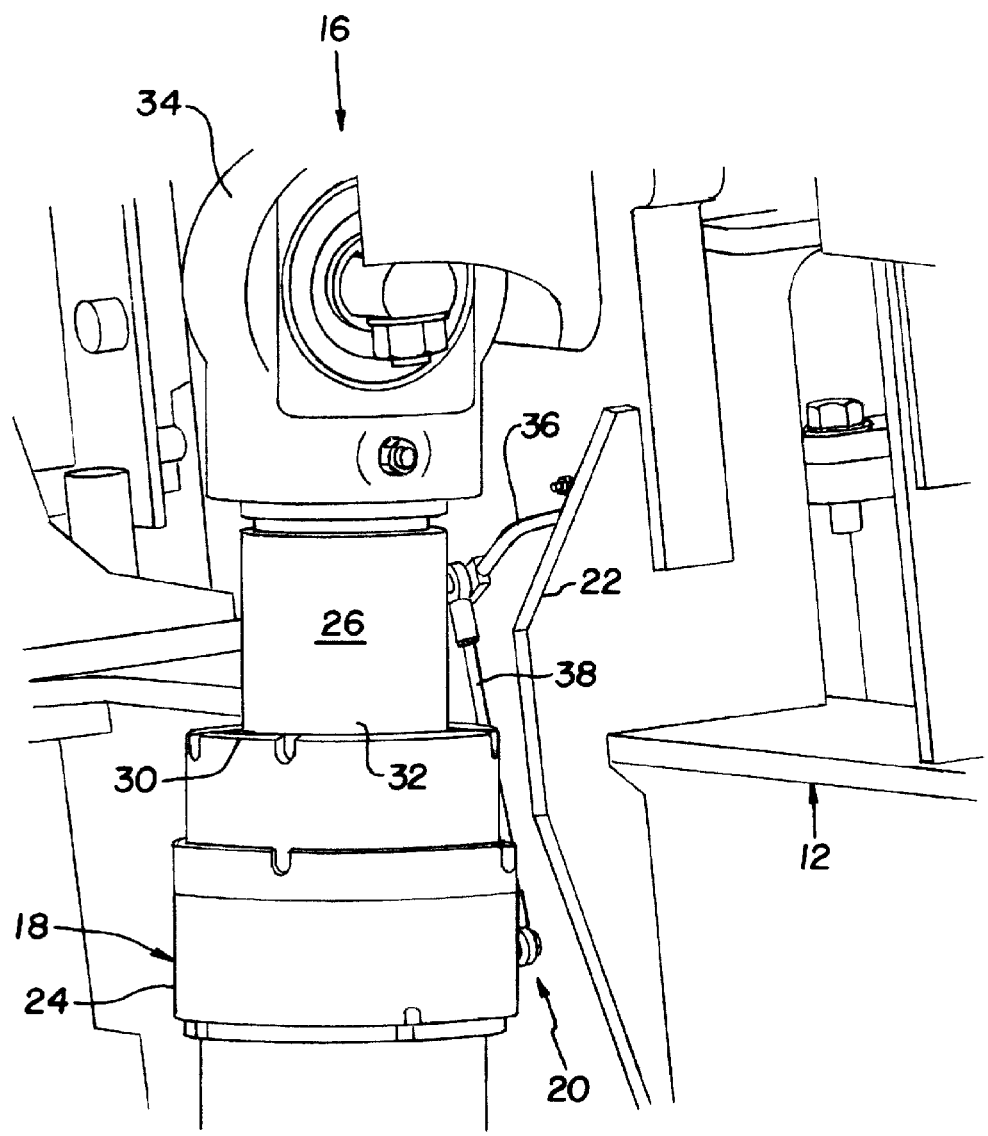
FIG. 2 is a close-up perspective view of the suspension strut, with a sensor assembly interconnected between the chassis and barrel of the strut.
Figure 3:
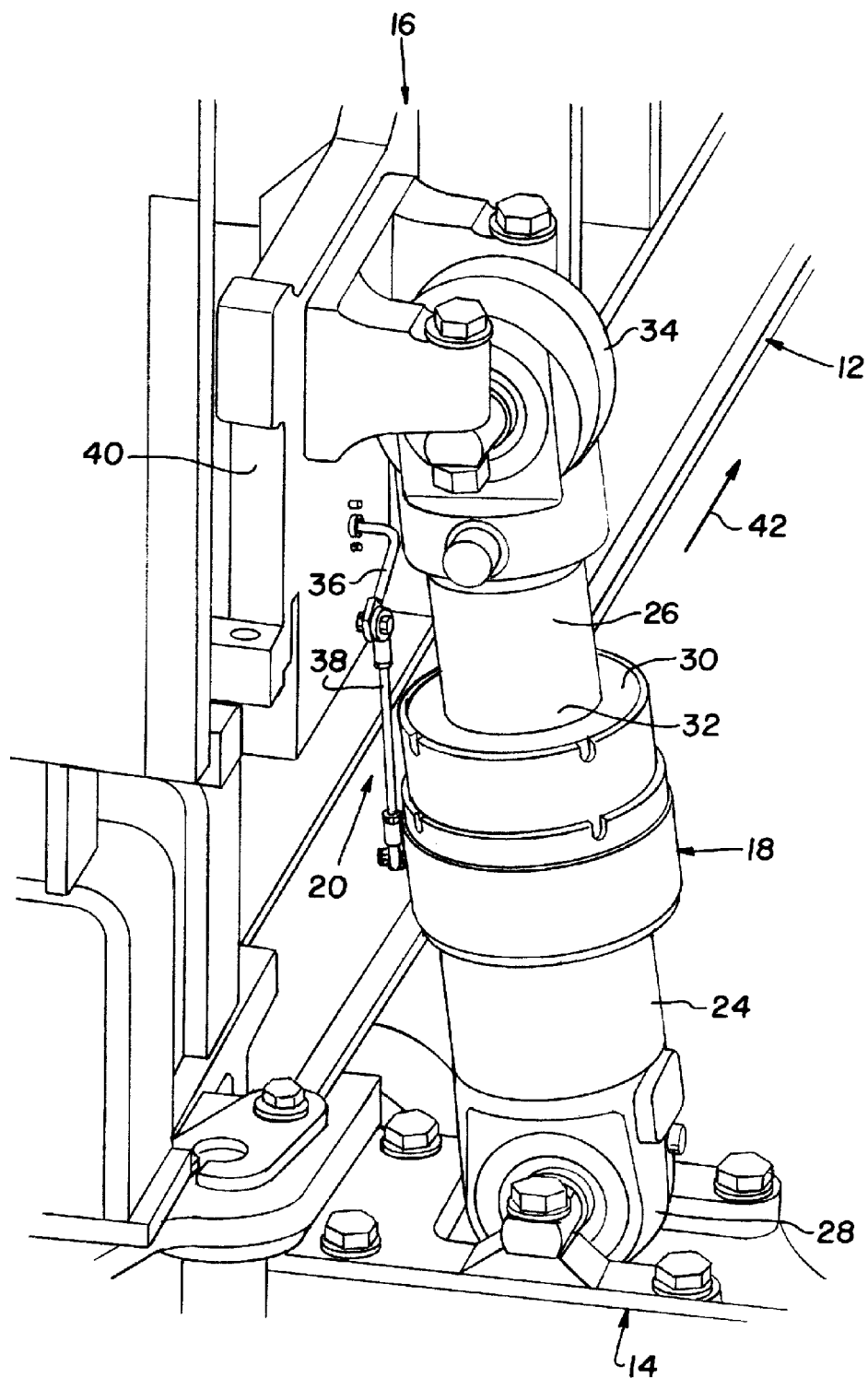
FIG. 3 is another perspective view of the suspension strut and sensor assembly, with a protective structure in the form of a plate removed to view the sensor assembly.
Figure 4:
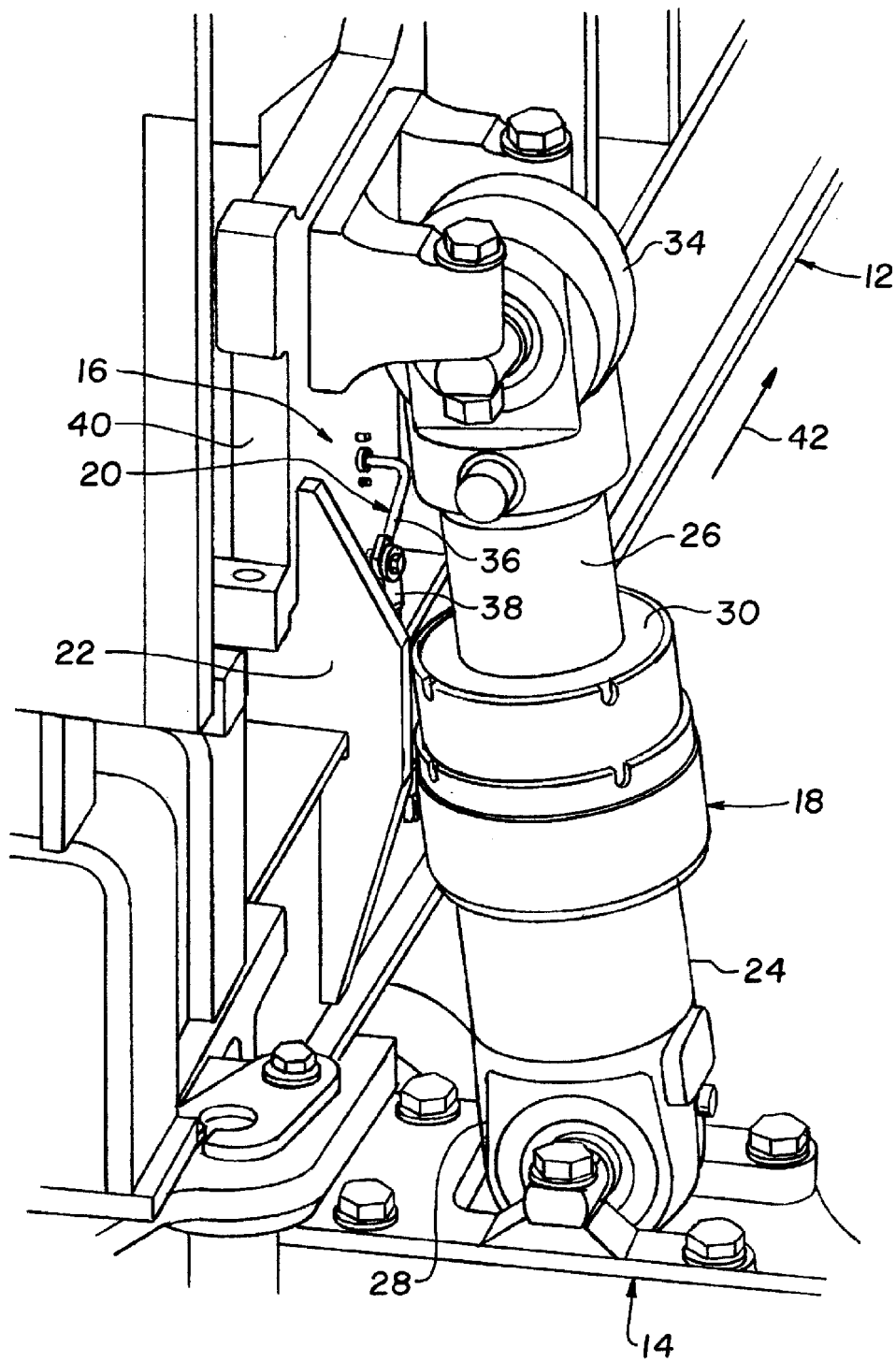
FIG. 4 is a perspective view similar to that shown in FIG. 3, with the protective structure in place.
Figure 5:
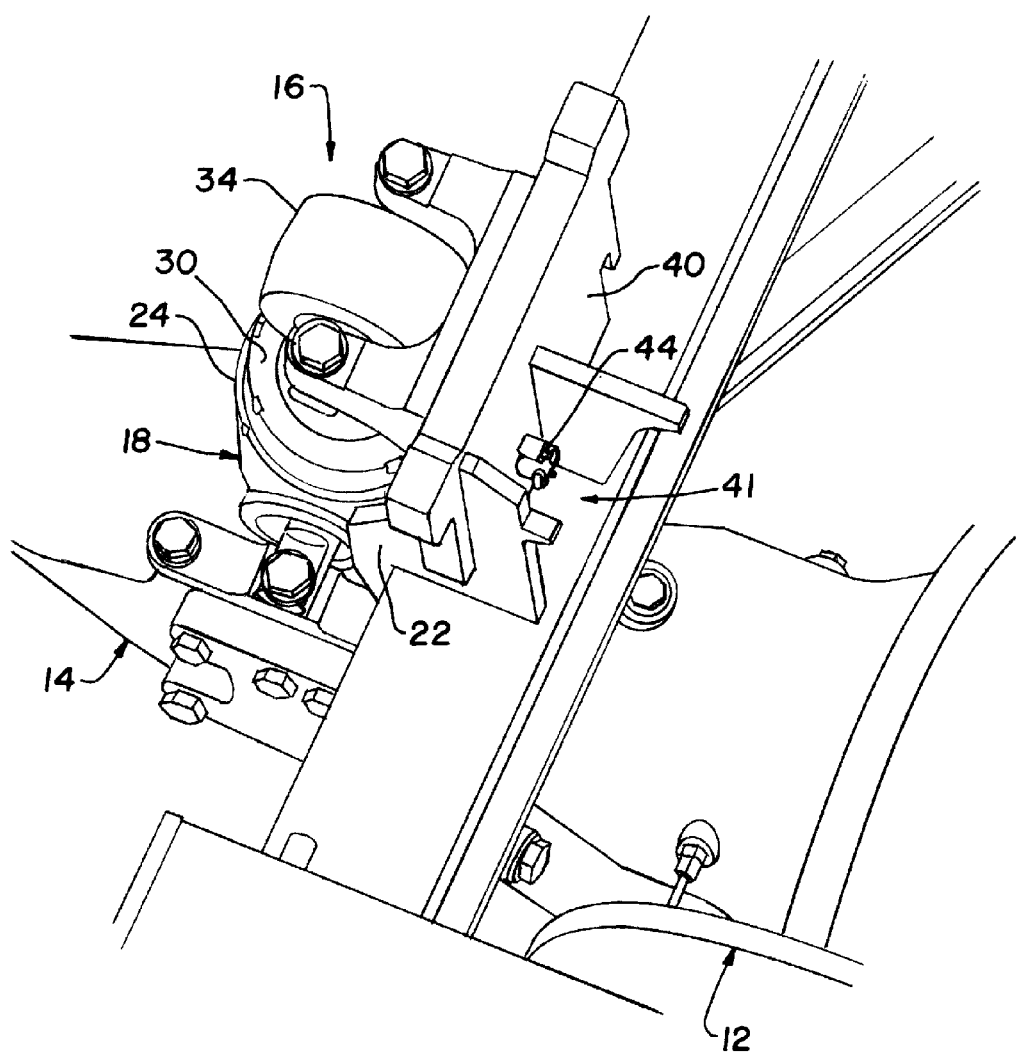
FIG. 5 is a top, perspective view of the suspension strut and sensor assembly.

Referring to FIGS. 2 and 3, sensor assembly 20 includes a pivoting lever arm 36 and a straight link 38. Lever arm 36 has one end which extends through a plate 40 of chassis 12 to a protected area 41 behind plate 40. As rod 26 slides up and down within barrel 24 during operation of vehicle 10, lever arm 36 pivots up and down in an oscillating fashion, depending on the stroke length of rod 26 within barrel 24. The opposite or distal end of lever arm 36 is pivotally connected with the top end of link 38, which in turn has a bottom end which is pivotally connected with upper end 28 of barrel 24.

Although sensor assembly 20 is illustrated as including a pivotally oscillating lever arm 36 in the illustrated embodiment, it is to be understood that other types of sensor assemblies may also be used for sensing the vertical displacement between chassis 12 and barrel 24. For example, it may be possible to use a cantilever-type pivoting arm as part of sensor assembly 20, rather than a rotating lever arm, with the angular position of the pivoting arm corresponding to the vertical displacement between chassis 12 and barrel 24.

A pair of protective structures 22 are carried by chassis 12 and extend outwardly from chassis 12 to at least partially protect sensor assembly 20 from physical damage in the event that debris or other matter passes over the top of axle 14 during operation of vehicle 10. In the illustrated embodiment, each protective structure 22 is in the form of a plate with a predefined shape which basically covers the area or gap between suspension strut 18 and chassis 12. It will be appreciated that the shape of the plate may vary, depending upon the particular vehicle and application. Further, as most travel of vehicle 10 will be in a forward direction, a protective structure is preferably at least positioned ahead of sensor assembly 20, relative to a travel direction 42. However, since it is also possible for vehicle 10 to be moved in a rearward direction and perhaps encounter debris in the process, a second protective structure 22 is also even more preferably positioned behind sensor assembly 20, relative to travel direction 42.

During operation, axle 14 pivots relative to chassis 12 as vehicle 10 travels over uneven or rough terrain. As axle 14 pivots relative to chassis 12, the attachment location with suspension strut 18 likewise goes up and down relative to chassis 12. As the attachment location with suspension strut 18 goes up and down, rod 26 in turn slides in and out of barrel 24. Movement of rod 26 within barrel 24 changes the vertical displacement between chassis 12 and barrel 24 (and likewise the vertical displacement between chassis 12 and axle 14), which changes the pivotal orientation of lever arm 36 extending through plate 40. The back side of lever arm 36 may be associated with any suitable electronic structure for providing an output signal to a controller for affecting ride control of vehicle 10. For example, the end of lever arm 36 extending through plate 40 into protected area 41 may be connected to a potentiometer or other suitable electrical component 44 forming part of sensor assembly 20, which provides an output signal to the controller for ride control of vehicle 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
 a chassis;
 an axle;
 a suspension strut including a barrel having a lower end and an upper end, and a rod having a lower end and an upper end, said rod lower end slidably received within said barrel upper end, said barrel lower end coupled with said axle and said rod upper end coupled with said chassis;
 a sensor assembly coupled between said chassis and said barrel for sensing relative movement between said chassis and said barrel; and,
 a protective structure carried by said chassis and covering the area between said chassis and said strut, and wherein said sensor assembly is protected from physical damage, wherein said protective structure includes a plate extending outward from said chassis positioned ahead of said sensor assembly relative to a travel direction of the vehicle, wherein said plate has a predefined shape which substantially covers the area between said suspension strut and said chassis.

2. The vehicle of claim 1, wherein said sensor assembly is coupled with said upper end of said barrel.

3. The vehicle of claim 1, wherein said sensor assembly indirectly senses relative movement between said chassis and said axle.

4. The vehicle of claim 1, wherein said sensor assembly is external to said barrel.

* * * * *